United States Patent [19]

Hoshi

[11] Patent Number: 4,490,758
[45] Date of Patent: Dec. 25, 1984

[54] PINCH-HOLDER FOR MAGNETIC DISK
[75] Inventor: Akio Hoshi, Chichibu, Japan
[73] Assignee: Canon Denshi Kabushiki Kaisha, Saitama, Japan
[21] Appl. No.: 348,150
[22] Filed: Feb. 11, 1982
[30] Foreign Application Priority Data Mar. 19, 1981 [JP] Japan .................. 56-40147

[51] Int. Cl.³ .............................. G11B 5/54
[52] U.S. Cl. ..................... 360/105; 360/75
[58] Field of Search ............ 360/103, 105, 97, 75
[56] References Cited

U.S. PATENT DOCUMENTS 4,241,366 12/1980 Nishida et al. ............... 360/105
4,302,789 11/1981 Vos .................................. 360/105
4,375,070 2/1983 Isozaki et al. .............. 360/105 X Primary Examiner—John H. Wolff
Attorney, Agent, or Firm—Fitzpatrick, Cella, Harper & Scinto

[57] ABSTRACT

A pinch-holder for magnetic disc is provided in which a pinch member for holding a magnetic disc is brought into contact with the magnetic disc through at least two steps so that any damage on the magnetic disc can be prevented. Further, the magnetic heads provided as the pinch member is never subjected to strong impact force thereby preventing the magnetic heads from deteriorating or being damaged by such strong impact force and further reducing the noise generated by the solenoid used for driving the pinch member.

8 Claims, 4 Drawing Figures

PINCH-HOLDER FOR MAGNETIC DISK

BACKGROUND OF THE INVENTION

1. Field of the Invention

The present invention relates to a pinch-holder for a magnetic disc of the type in which a magnetic disc is pinched and is supported by disc pinching means.

2. Description of the Prior Art

A floppy disc unit is known and is used as an external memory for an electronic computer and the like. In this unit, a magnetic disc contained in a jacket is rotated and a magnetic disc or discs are brought into contact with the rotating magnetic disc for recording or for reproducing data on or from the magnetic disc.

As one type of such a floppy disc unit there is known a disc unit in which two magnetic heads are provided opposite to each other with one head being provided on the upper surface side of the magnetic head unit and the other head being provided on the lower surface side. FIG. 1 shows the essential part of such a known floppy disc unit.

In FIG. 1, the reference numeral 1 depicts a magnetic disc contained in a jacket 2. The jacket 2 is moved in the direction of arrow 3a until the magnetic disc 1 is positioned between two magnetic heads 10 and 11. Then, the magnetic disc 1 is turned about its center axis 4, that is the axis of rotation, by a driving means not shown. Next, a solenoid 5 is energized to rotate an actuator 6 about the rotation center, i.e. a fulcrum pin 7. The actuator 6 moves downwards in the direction of arrow 9a against the biasing force of a spring 8. Consequently, the magnetic disc 1 is pinched and is supported by the two magnetic heads 10 and 11 disposed opposite to each other which serve together as a pinch member. In this position, data recording or reproduction can be performed on the upper and lower surfaces of the magnetic disc 1 by the magnetic heads 10 and 11, respectively.

In the above known arrangement of disc unit, the gap formed between the two magnetic heads 10 and 11 is measured to allow the jacket 2 to be inserted into the gap. Taking into consideration the possible variation in thickness of the jacket, is required to be set at the gap size T a value larger than the jacket thickness t (T>t). The thickness of the above mentioned magnetic disc is $t_1$. Then, $T>t>t_1$ and on the operation of the solenoid 5 the pinch member (magnetic heads) has be be moved over a relatively large stroke from T to $t_1$ to pinch and to hold the magnetic disc. Since the stroke is relatively large, a strong impact force is applied to not only the magnetic disc 1 but also the magnetic heads 10 and 11 at the moment when the heads are brought into contact with the disc to hold the magnetic disc between the two magnetic heads.

Obviously, repetition of such an operation accompanied by a large impact will damage the magnetic disc 1 and deteriorate the characteristics of the magnetic heads 10 and 11. In the worst case, the magnetic heads may be broken. Moreover, large noise is generated for every solenoid operation.

SUMMARY OF THE INVENTION

Accordingly, it is an object of the present invention to prevent the magnetic head from being damaged by such impact force.

It is another object of the invention to prevent the magnetic heads from deteriorating or being broken by such impact force.

It is a further object of the invention to reduce the noise generated by the operation for pinching the magnetic disc.

Other and further objects, features and advantages of the present invention will appear more fully from the following description of the embodiments.

BRIEF DESCRIPTION OF THE DRAWINGS

FIG. 2 shows an embodiment of the present invention in which;

DESCRIPTION OF THE PREFERRED EMBODIMENT

Figure 1:
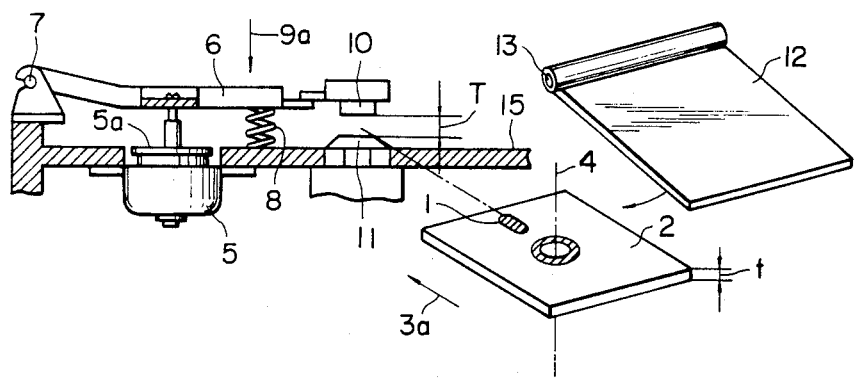
FIG. 1 is a side view of the essential part of the magnetic disc pinch-holder according to the prior art.
Figure 2A:
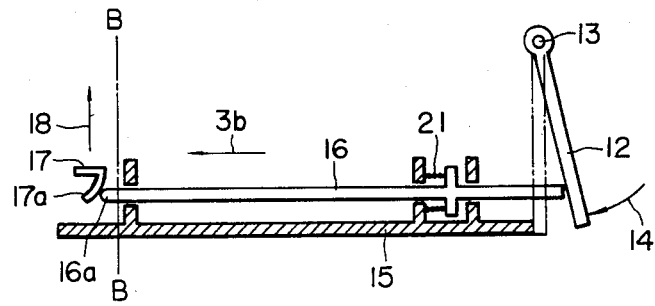
FIG. 2A is a side view thereof showing the arrangement of the cover member and the lever.

Referring first to FIG. 2A showing an embodiment of the present invention, the magnetic disc pinch-holder has a cover member 12 and a lever 17. The cover member 12 is closed after the jacket 2 has been pushed into the above mentioned gap in the direction of arrow 3a as shown in FIG. 1. The cover member 12 is closed by rotating it about a pivot 13 in the direction of arrow 14 shown in FIG. 2A. By this rotation of the cover member, a rod member 16, which is slide movably supported on a base 15, is moved in the direction of arrow 3b against the biasing force of a coil spring 21. Finally, one end 16a of the rod member 16 comes into contact with the sloping surface portion 17a of the lever 17 and pushes it upwards as indicated by arrow 18.

Figure 2B:
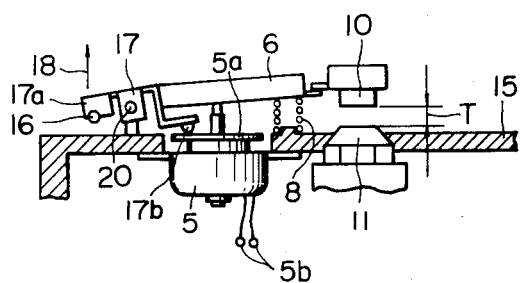
FIGS. 2B and 2C are partially sectional views thereof in the position before the first step and in the position after the first step, respectively.

FIG. 2B is a cross-sectional view taken along the chain-dotted line B—B and looking in the direction of arrow 3b in FIG. 2A. This view of FIG. 2B substantially corresponds to that of FIG. 1.

As seen in FIG. 2B, the lever 17 is supported to swing about a fulcrum 20. When the one end 17a of the lever is pushed up in the direction of arrow 18 by the rod member 16 in the manner described above and shown in FIG. 2A, the other end 17b of the lever 17 formed as a contact part moves downwards and pushes a disc plate 5a down. The disc plate 5a is provided on a solenoid 5. In this course of motion, the apparatus comes to the position shown in FIG. 2C from that in FIG. 2B. This step of movement is hereinafter referred to as first step.

Figure 2C:
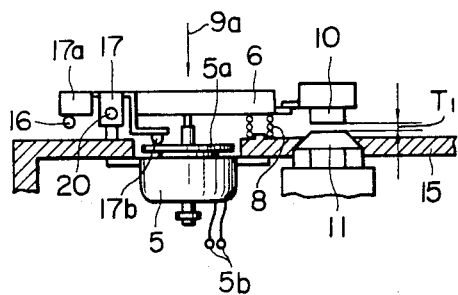

FIG. 2C is a view similar to FIG. 2B. Although not shown in FIGS. 2B and 2C, a magnetic disc is positioned between the two magnetic heads 10 and 11. In the position shown in FIG. 2B, the gap between the two magnetic heads is T in thickness. Through the first step described about, the gap is reduced to $T_1$ shown in FIG. 2C. In other words, the size of the gap formed between magnetic heads 10 and 11 changes from T to $T_1$ ($T>T_1$) during the first step.

In the position shown in FIG. 2C, an electric current is supplied to the terminals 5b of the solenoid 5 to energize the latter. On the actuation of the solenoid 5, the actuator 6 and therefore the upper magnetic head 10 are moved further down in the direction of arrow 9b. This is the second step of operation of this apparatus. By this second step, the magnetic disc of $t_1$ in thickness (not shown) is finally pinched by the two magnetic heads 10 and 11 to hold the magnetic disc therebetween. At the second step, the gap between the two magnetic heads 10 and 11 is reduced to $t_1$ from $T_1$ ($T > t \geqq T_1 > t_1$). Therefore, when the solenoid 5 is excited to hold the magnetic disc at the second step, the upper magnetic head 10 is started from $T_1$ and is moved over a very short stroke of from $T_1$ to $t_1$. It is no longer necessary to move the magnetic head over a large stroke of from $T_1$ to $t_1$ by the solenoid 5 as in the case of the prior art apparatus shown in FIG. 1. This small stroke at the second step is the essential feature of the present invention. In the present pinch-holder according to the invention, therefore, the impact force applied to the magnetic disc and the magnetic heads at the time of the magnetic disc being finally pinched and held between the magnetic heads is reduced to a great extent as compared with the prior art apparatus. Since the impact is greatly reduced, the possibility of damage on the magnetic disc and/or the magnetic head by such impact is minimized according to the present invention. In addition, the noise generated at the operation of solenoid is substantially reduced because of the small stroke of the solenoid.

What I claim is:

1. A pinch-holder for a magnetic disc, comprising:
    means having a first pinch member and a second pinch member for pinching and supporting a magentic disc therebetween, said first pinch member and second pinch member being mounted for relative movement toward and away from each other between a first position spaced relatively far apart, a second position spaced less far apart than in said first position, and a third position for pinching and supporting a magnetic disc therebetween;
    moving means for moving said first pinch member and said second pinch member between said first and second positions; and
    driving means for moving said first pinch member from said second position to said third position to pinch and support a magnetic disc between said first pinch member and said second pinch member, whereby relative impact between said first and second pinch members and the magnetic disc, upon movement of said first and second pinch members to said third position, is mitigated.

2. A pinch-holder for a magnetic disc as set forth in claim 1, wherein said first pinch member and said second pinch member include a pair of magnetic heads arranged opposite each other.

3. A pinch-holder for a magnetic disc, comprising:
    pinching means including a first pinch member and a second pinch member for pinching a magnetic disc therebetween;
    supporting means for supporting said first pinch member and said second pinch member for relative movement between a first position spaced relatively far apart, a second position spaced less far apart than in said first position, and a third position for pinching and supporting a magnetic disc therebetween;
    driving means for driving said supporting means to move said first pinch member and said second pinch member to said third position to pinch a magnetic disc therebetween;
    moving means having a portion thereof which is coupled to said pinching means and said driving means and upon which a force can be applied, said moving means for moving said first pinch member and said second pinch member from said first position to said second position; and
    transmitting means for transmitting a driving force to said moving means, whereby relative impact between said first and second pinch members and the magnetic disc, upon movement of said first and second pinch members to said third position, is mitigated.

4. A pinch-holder for a magnetic disc as set forth in claim 3, wherein said driving means acts so that said pinching means pinches and supports the magnetic disc after completion of the movement by said moving means.

5. A pinch-holder for a magnetic disc, comprising:
    pinching means including a first pinch member and a second pinch member for pinching a magnetic disc therebetween;
    supporting means for supporting said first pinch member and said second pinch member for movement between a first position spaced relatively far apart, a second position spaced less far apart than in said first position, and a third position for pinching and holding a magnetic disc therebetween;
    driving means for driving said supporting means to move said first pinch member and said second pinch member from said second position to said third position; and
    moving means having a portion coupled to said supporting means and said driving means and upon which a force can be applied, said moving means for moving the first pinch member and said second pinch member from said first position to said second position upon application of a force thereto, whereby relative impact between said first and second pinch members and the magnetic disc, upon movement of said first and second pinch members to said third position, is mitigated.

6. A pinch-holder for a magnetic disc as set forth in claim 5, wherein said first pinch member and said second pinch member include a pair of magnetic heads arranged opposite each other.

7. A pinch-holder for a magnetic disc, comprising:
    a pair of magnetic heads opposing each other, one of said pair of magnetic heads adapted to face one surface of a magnetic disc and the other of said pair of magnetic heads adapted to face the other surface of the magnetic disc;
    an arm for movably supporting one of said pair of magnetic heads;
    a solenoid for driving said arm in the direction in which the magnetic disc is pinched and is held by said pair of magnetic heads; and
    a lever for driving said arm and said solenoid when a force is applied to one of said arm and said solenoid, application of a force to said one of said arm and said solenoid causing said lever to drive said arm to move said one of said pair of magnetic heads toward the other of said magnetic heads in a first step, and said solenoid driving said arm to move said one of said pair of magnetic heads toward the other of said magnetic heads to pinch and hold a magnetic disc therebetween in a second step, whereby relative impact between the magnetic heads and the magnetic disc is mitigated.

8. A pinch-holder for a magnetic disc as set forth in claim 7, further comprising:
    a cover member rotatably supported on said pinch-holder; and
    a rod member movable in a predetermined direction by a rotation force of said cover member to drive said lever.

* * * * *